United States Patent
Jones et al.

(10) Patent No.: US 12,386,516 B2
(45) Date of Patent: Aug. 12, 2025

(54) SYSTEMS AND METHODS HOST AND DEVICE COOPERATION FOR MANAGING A MEMORY OF THE DEVICE

(71) Applicant: Samsung Electronics Co., Ltd., Suwon-si (KR)

(72) Inventors: Marc Timothy Jones, Longmont, CO (US); Daniel Lee Helmick, Thornton, CO (US)

(73) Assignee: Samsung Electronics Co., Ltd., Yongin-si (KR)

( * ) Notice: Subject to any disclaimer, the term of this patent is extended or adjusted under 35 U.S.C. 154(b) by 0 days.

(21) Appl. No.: 18/521,664

(22) Filed: Nov. 28, 2023

(65) Prior Publication Data

US 2025/0085862 A1   Mar. 13, 2025

Related U.S. Application Data

(60) Provisional application No. 63/537,094, filed on Sep. 7, 2023.

(51) Int. Cl.
*G06F 12/0815* (2016.01)
*G06F 3/06* (2006.01)

(52) U.S. Cl.
CPC .......... *G06F 3/0616* (2013.01); *G06F 3/0631* (2013.01); *G06F 3/0679* (2013.01); *G06F 12/0815* (2013.01)

(58) Field of Classification Search
CPC .... G06F 3/0616; G06F 3/0631; G06F 3/0679; G06F 12/0815

USPC .................................................. 711/103, 118
See application file for complete search history.

(56) References Cited

U.S. PATENT DOCUMENTS

| | | | |
|---|---|---|---|
| 9,454,481 B2 | 9/2016 | Jacobs et al. | |
| 11,599,468 B1 | 3/2023 | Turner et al. | |
| 11,615,023 B2 | 3/2023 | Holmberg et al. | |
| 2010/0125695 A1* | 5/2010 | Wu | G06F 12/084 711/E12.083 |
| 2014/0047161 A1* | 2/2014 | Nemazie | G06F 12/0246 711/103 |
| 2022/0114086 A1 | 4/2022 | Clark et al. | |
| 2022/0300184 A1* | 9/2022 | Yang | G06F 3/0616 |
| 2022/0405207 A1 | 12/2022 | Haj Aboutalebi et al. | |
| 2023/0057633 A1 | 2/2023 | Nguyen et al. | |
| 2023/0109533 A1 | 4/2023 | Biederman et al. | |

\* cited by examiner

*Primary Examiner* — Than Nguyen
(74) *Attorney, Agent, or Firm* — Lewis Roca Rothgerber Christie LLP

(57) ABSTRACT

One or more embodiments of the present disclosure are directed to systems and methods for host and device cooperation. In some embodiments, a storage device comprises a first memory for storing data; a second memory configured with a cache coherent protocol; and a processing circuit coupled to the first memory and the second memory. The processing circuit is configured to: store, in the second memory, information for managing the storage device, wherein the information is shared with a computing device via the cache coherent protocol; receive a first value from the computing device, the first value associated with a first block of the first memory; and take an action with respect to the first block based on the first value, wherein the action is for managing the first memory.

20 Claims, 7 Drawing Sheets

SYSTEMS AND METHODS HOST AND DEVICE COOPERATION FOR MANAGING A MEMORY OF THE DEVICE

CROSS-REFERENCE TO RELATED APPLICATION(S)

The present application claims priority to and the benefit of U.S. Provisional Application No. 63/537,094, filed Sep. 7, 2023, entitled "COOPERATIVE PROTOCOL INTERACTIONS USING CXL CACHING," the entire content of which is incorporated herein by reference.

FIELD

One or more aspects of embodiments according to the present disclosure relate to storage devices, and more particularly to systems and methods for allowing cooperation between a host computing device and a storage device for managing the storage device.

BACKGROUND

A storage device may maintain information for managing one or more aspects of the storage device. For example, the information may be used for garbage collection (e.g., determining which blocks of the storage device to erase), wear leveling, data placement, and/or another management operations. The management operations may help the storage device to function efficiently and prolong the storage device's lifespan.

The above information disclosed in this Background section is only for enhancement of understanding of the background of the present disclosure, and therefore, it may contain information that does not form prior art.

SUMMARY

One or more embodiments of the present disclosure are directed to a storage device comprising: a first memory for storing data; a second memory configured with a cache coherent protocol; and a processing circuit coupled to the first memory and the second memory. The processing circuit is configured to: store, in the second memory, information for managing the storage device, wherein the information is shared with a computing device via the cache coherent protocol; receive a first value from the computing device, the first value associated with a first block of the first memory; and take an action with respect to the first block based on the first value, wherein the action is for managing the first memory.

In some embodiments, the second memory includes a first cache memory and the computing device includes a second cache memory, wherein the information and the first value are stored in the first cache memory and the second cache memory.

In some embodiments, the information for managing the storage device includes at least one of: a number of valid blocks of the first memory; a number of invalid blocks of the first memory; a number of free blocks; or identification of a filled block.

In some embodiments, the information for managing the storage device includes at least one of a temperature of the storage device, endurance estimate associated with the storage device, or utilization of the storage device.

In some embodiments, the first value includes an indication that the first block has been selected by the computing device.

In some embodiments, the action includes a garbage collection action.

In some embodiments, the action includes a wear leveling action.

In some embodiments, the computing device is configured to set the first value based on a rule. The rule may include identification of a threshold number of available blocks of the first memory In some embodiments, the processing circuit is configured to: detect a trigger for taking the action; identify a second block of the first memory based on the trigger; add the first block and the second block as candidates for taking the action.

In some embodiments, the processing circuit is configured to: signal the computing device relating to the first block based on taking the action.

In some embodiments, the signal is indicative of the processing circuit having performed the action.

In some embodiments, the computing device is configured to set the first value based on the information shared via the cache coherent protocol.

One or more embodiments of the present disclosure are also directed to a method that includes: storing data in a first memory of a storage device; storing, in a second memory of the storage device, information for managing the storage device, wherein the information is shared with a computing device via a cache coherent protocol; receiving a first value from a computing device, the first value associated with a first block of the first memory; and taking an action with respect to the first block based on the first value, wherein the action is for managing the first memory.

These and other features, aspects and advantages of the embodiments of the present disclosure will be more fully understood when considered with respect to the following detailed description, appended claims, and accompanying drawings. Of course, the actual scope of the invention is defined by the appended claims.

BRIEF DESCRIPTION OF THE DRAWINGS

Non-limiting and non-exhaustive embodiments of the present embodiments are described with reference to the following figures, wherein like reference numerals refer to like parts throughout the various views unless otherwise specified.

DETAILED DESCRIPTION

Figure 1:
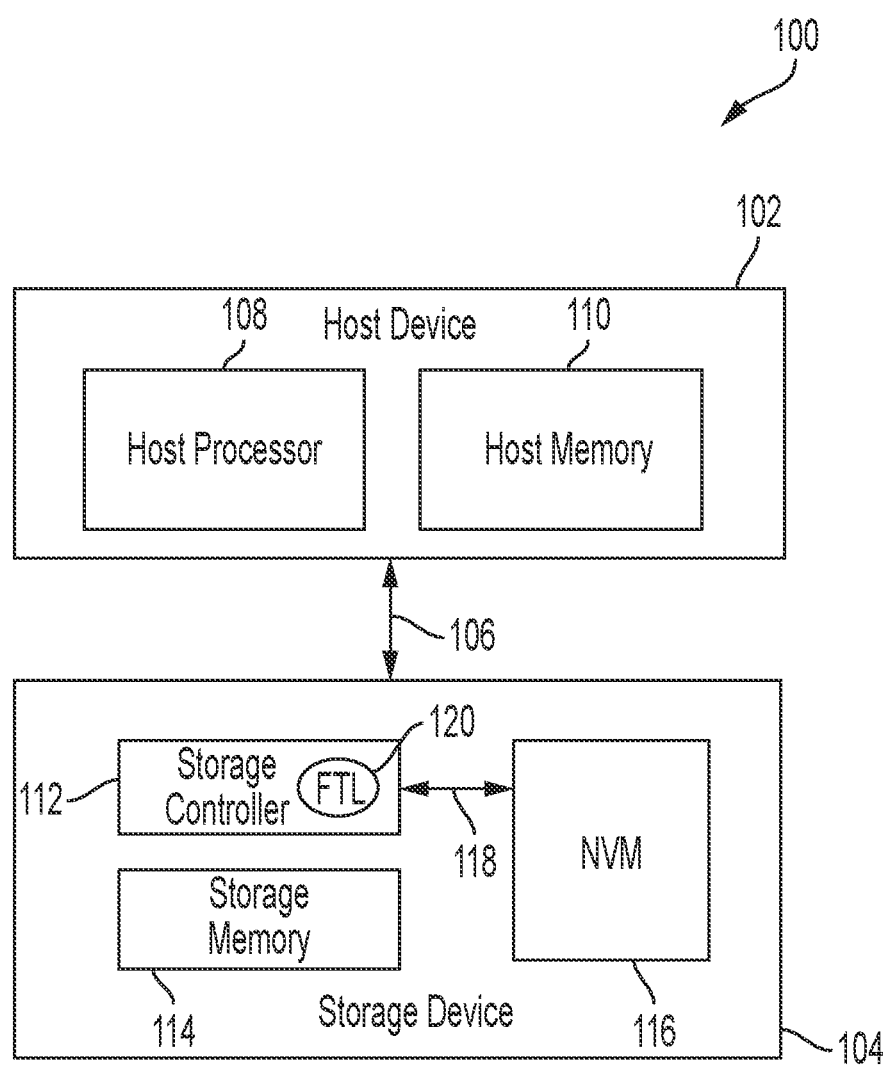
FIG. 1 depicts a block diagram of a storage system according to one or more embodiments.

Hereinafter, example embodiments will be described in more detail with reference to the accompanying drawings, in which like reference numbers refer to like elements throughout. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, descriptions thereof may not be repeated. Further, in the drawings, the relative sizes of elements, layers, and regions may be exaggerated and/or simplified for clarity.

Embodiments of the present disclosure are described below with reference to block diagrams and flow diagrams. Thus, it should be understood that each block of the block diagrams and flow diagrams may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (for example the executable instructions, instructions for execution, program code, and/or the like) on a computer-readable storage medium for execution. For example, retrieval, loading, and execution of code may be performed sequentially such that one instruction is retrieved, loaded, and executed at a time. In some example embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flow diagrams. Accordingly, the block diagrams and flow diagrams support various combinations of embodiments for performing the specified instructions, operations, or steps.

A storage device (e.g., a solid-state drive (SSD)) may maintain information for managing one or more aspects of the storage device (also referred to as drive or management activities). For example, the storage device may maintain information on available memory blocks, filled memory blocks, whether the filled blocks are valid or invalid, statistics about storage utilization, temperature inside the SSD, and/or other control and statistical information (also referred to as log information or log data). The temperature may include data temperature based on the frequency of access of data (e.g., hot data being accessed more frequently than cold data)) and/or the physical temperature within the SSD. The information may be used for managing the drive activities. It may be desirable for a host computing device (hereinafter referred to as a "host" or "host device") and the storage device to collaborate with one another performing one or more drive activities using the log data. The cooperation between the host and the storage device may improve management of the storage device, helping increase the efficiencies of the storage device and prolong its lifespan.

In general terms, one or more embodiments of the present disclosure are directed to sharing management log data with a host device to allow the host to intelligently contribute in a management activity of the storage device. The management activity may be, for example, garbage collection, wear leveling, data placement, and/or another management operation of the storage device.

The sharing of the log data may be via a cache coherent protocol such as, for example, Compute Express Link™ (CXL™). The cache coherent protocol may allow the log data that is stored and cached in the storage device, to be exposed and cached in the host. As changes are made by either the storage device or the host, the changes are mirrored via the cache coherent protocol. For example, changes made by the storage device are propagated to a cache in the host, and vice versa. The host may thus have access to drive-level statistics and other log data of the storage device in real-time, allowing for improved decision-making by the host as the host engages in the one or more drive activities, including drive activities that the host may have knowledge of while the storage device may be unaware of those drive activities (e.g., upcoming deallocation decisions of drive blocks by the host).

A mechanism for providing at least some of the log data to the host is via a transport protocol such as NVMe. For example, the host may transmit a command (e.g., a "get log page" command) to the storage device, and receive the requested data in response to the command. The receiving of log data via NVMe, however, may be subject to processing latencies and delays that may affect the decision making by the host. The latencies and delays may be, for example, due to the need to allocate a buffer in the host memory for receiving the requested data, transmitting a command to read the data into the host buffer, and storing the data in the host cache as the host starts to access the buffer.

In addition, the timing of processing of commands to retrieve log data may be non-deterministic, and dependent upon workload of the storage device. Commands to retrieve log data may be a low priority command that may be put aside for processing if the storage device is busy with higher priority commands. The delay in receiving the log data, however, may adversely affect the host's ability to cooperate with the storage device in the drive activities.

The sharing of log data via a cache coherent protocol may help address the above issues. Due to cache coherency, changes to the log data made by the host or the storage device may be made available to the other device, for example, in real time. The reduction of the delay in providing the data to the host may help accelerate decision making by the host, and allow the decision to reflect the current situation of the storage device. For example, the host may make data placement and/or garbage collection decisions, in a more expedited manner, and based on more current data. This may in turn allow a more optimal management of the storage device.

FIG. 1 depicts a block diagram of a storage system 100 according to one or more embodiments. The storage system 100 includes a host computing device 102 connected to a storage device 104, but the present disclosure is not limited thereto, and the storage system 100 may include any suitable number of host devices that are each connected to any suitable number of storage devices.

Referring to FIG. 1, the host device 102 may be connected to the storage device 104 over a host interface 106. The host device 102 may issue data access commands (e.g., load/read, or store/write commands) to the storage device 104 over the host interface 106, and may receive responses from the storage device 104 over the host interface 206. For example, the responses may include requested data stored in the storage device 104, and/or a notification from the storage device 104 that a corresponding data request command has been successfully executed by the storage device 104.

The host device 102 may include a host processor 108 and host memory 110. The host processor 108 may be a processing circuit, for example, such as a general purpose processor or a central processing unit (CPU) core of the host device 102. The host processor 108 may be connected to other components via an address bus, a control bus, a data bus, and/or the like. The host memory 110 may be considered as high performing main memory (e.g., primary memory) of the host device 102. For example, in some embodiments, the host memory 110 may include (or may be) volatile memory, for example, such as dynamic random-access memory (DRAM). However, the present disclosure is not limited thereto, and the host memory 210 may include (or may be) any suitable high performing main memory (e.g., primary memory) replacement for the host device 102 as would be known to those skilled in the art. For example, in other embodiments, the host memory 110 may be relatively high performing non-volatile memory, such as NAND flash memory, Phase Change Memory (PCM), Resistive RAM, Spin-transfer Torque RAM (STTRAM), any suitable memory based on PCM technology, memristor technology, and/or resistive random access memory (ReRAM), and can include, for example, chalcogenides, and/or the like.

The storage device 104 may be considered as secondary memory that may persistently store data accessible by the host device 102. In some embodiments, the storage device 104 may be secondary memory of the host device 102, for example, such as a Solid-State Drive (SSD). However, the present disclosure is not limited thereto, and in other embodiments, the storage device 104 may include (or may be) any suitable storage device, for example, such as a magnetic storage device (e.g., a hard disk drive (HDD), and the like), an optical storage device (e.g., a Blue-ray disc drive, a compact disc (CD) drive, a digital versatile disc (DVD) drive, and the like), other kinds of flash memory devices (e.g., a USB flash drive, and the like), and/or the like. In various embodiments, the storage device 104 may conform to a large form factor standard (e.g., a 3.5 inch hard drive form-factor), a small form factor standard (e.g., a 2.5 inch hard drive form-factor), an M.2 form factor, an E1.S form factor, and/or the like. In other embodiments, the storage device 104 may conform to any suitable or desired derivative of these form factors. For convenience, the storage device 104 may be described hereinafter in the context of an SSD, but the present disclosure is not limited thereto.

The storage device 104 may be communicably connected to the host device 102 over the host interface 106. The host interface 106 may facilitate communications (e.g., using a connector and a protocol) between the host device 102 and the storage device 104. In some embodiments, the host interface 106 may facilitate the exchange of storage or memory requests and responses between the host device 102 and the storage device 104. In some embodiments, the host interface 106 may facilitate the transfer of log data and other management information to and from the host processor 108 and/or host memory 110. For example, in various embodiments, the host interface 106 (e.g., the connector and the protocol thereof) may include (or may conform to) a Compute Express Link™ (CXL™), Cache Coherent Interconnect for Accelerators (CCIX), Small Computer System Interface (SCSI), Non Volatile Memory Express (NVMe), Peripheral Component Interconnect Express (PCIe), remote direct memory access (RDMA) over Ethernet, Serial Advanced Technology Attachment (SATA), Fiber Channel, Serial Attached SCSI (SAS), NVMe over Fabric (NVMe-oF), iWARP protocol, InfiniBand protocol, 5G wireless protocol, Wi-Fi protocol, Bluetooth protocol, and/or the like. In other embodiments, the host interface 106 (e.g., the connector and the protocol thereof) may include (or may conform to) various general-purpose interfaces, for example, such as Ethernet, Universal Serial Bus (USB), and/or the like.

In some embodiments, the storage device 104 may include a storage controller 112, storage memory 114, non-volatile memory (NVM) 116, and a storage interface 118. The storage memory 114 may be high-performing memory of the storage device 104, and may include (or may be) volatile memory, for example, such as DRAM, but the present disclosure is not limited thereto, and the storage memory 114 may be any suitable kind of high-performing volatile or non-volatile memory. The NVM 116 may persistently store data received, for example, from the host device 102. The NVM 116 may include, for example, NAND flash memory, but the present disclosure is not limited thereto, and the NVM 116 may include any suitable kind of memory for persistently storing the data according to an implementation of the storage device 104 (e.g., magnetic disks, tape, optical disks, and/or the like).

The storage controller 112 may be connected to the NVM 116 over the storage interface 118. In some embodiments, the storage controller 112 may include, for example, a digital circuit (e.g., a microcontroller, a microprocessor, a digital signal processor, or a logic device (e.g., a field programmable gate array (FPGA), an application-specific integrated circuit (ASIC), and/or the like (collectively referenced as a processor)). The digital circuit may include a memory storing instructions (e.g., software, firmware, and/or hardware code) for being executed by the processor, for carrying out the functionality descried herein.

In some embodiments, the storage controller 112 is configured to receive data access requests from the host device 102. Using CXL™ as an example, the data access request may be a disk request based on a CXL.io protocol, that allows the NVM 116 to be accessed by the host CPU as disk storage. In some embodiments, the data access request is a memory request based on a CXL.mem or CXL.cache protocol. For example, the storage device may use the storage memory 114 as a cache to service memory requests, and issue read/write request (e.g., disk requests) to the NVM 116 as needed (e.g., on cache misses).

In some embodiments, the storage controller 112 includes a flash translation layer (FTL) 120 that receives the data access request and interfaces with the NVM 116 to read data from, and write data to, the NVM. In this regard, the FTL 120 may translate a disk block address to a flash block address. In doing so, the FTL 120 may engage in wear leveling to move data around the storage cells of the NVM 116 to evenly distribute the writes to the NVM 116. The translations/block level accesses may be done based on read/writes (e.g., disk accesses over CXL.io) or load/stores (e.g., memory accesses over CXL.mem/CXL.cache).

In some embodiments, the storage controller 112 (e.g., the FLT 120) is also configured to implement garbage collection (GC). For example, a block a data may contain one or more pages that contain valid data and/or invalid data. The storage controller 112 may identify the pages within the block of data that contain the invalid data, and move the pages of the block that contain the valid data to another block. The storage controller 112 may then erase the data from the original block. The shifting of data may result in more program/erase (P/E) cycles than requested by the host device 102, and create a situation referred to as write amplification.

In some embodiments, the storage controller 112 further incorporates wear leveling into the GC operation to distribute the P/E cycles more evenly across the storage blocks to prevent overused blocks from wearing out. Wear leveling may thus help extend the life of the storage device.

Figure 2:
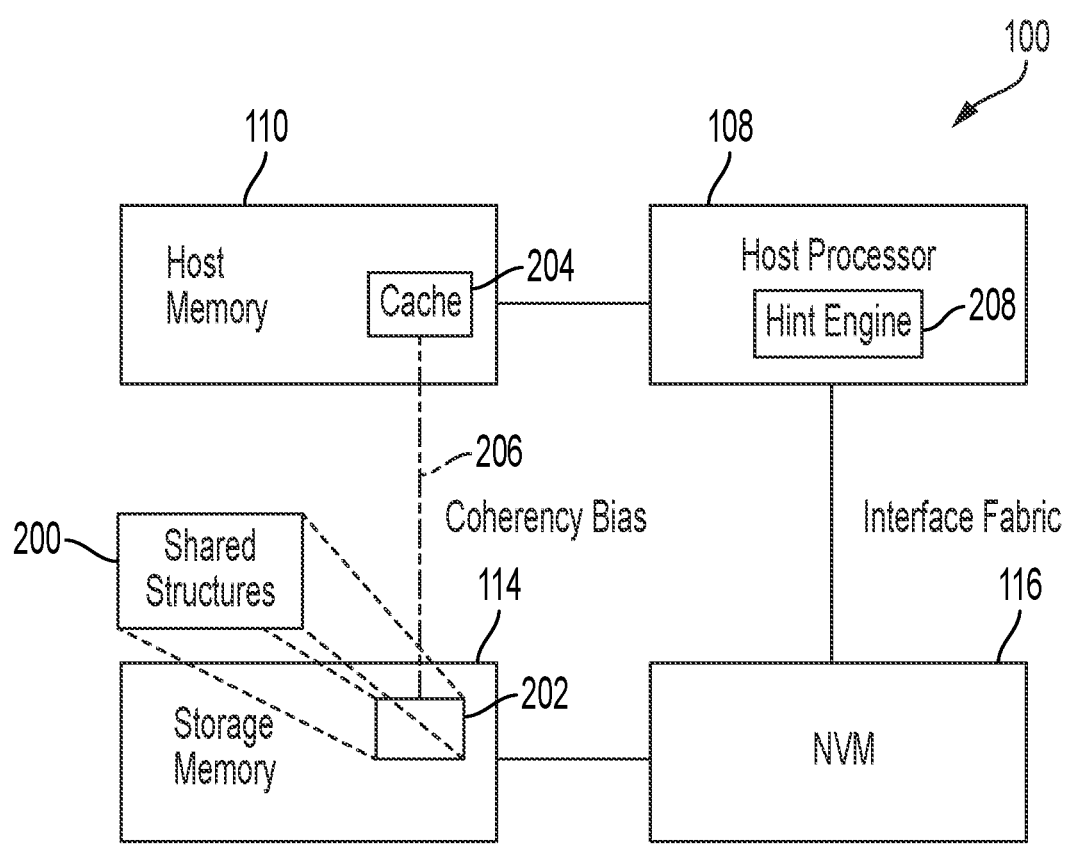
FIG. 2 depicts another block diagram of the storage system of FIG. 1, according to one or more embodiments.

FIG. 2 depicts another block diagram of the storage system 100 according to one or more embodiments. In some embodiments, the storage memory 114 stores log data in one or more data structures 200. The data structures 200 may be stored, for example, in a shared portion 202 of the storage memory 114, such as, for example, a device cache. In some embodiments, the shared portion 202 of the storage memory 114 (e.g., the device cache) is exposed to the host processor 108. The host processor 108 may access and store the shared data structures 200 in a host cache 204 of the host memory 110.

In some embodiments, coherency of the shared data structures 200 may be provided by a cache coherent protocol such as CXL™. A coherency bias 206 such as, for example, a device coherency bias may be used for ensuring coherency of the shared data structures 200. According to the device coherency bias, the real state of the data is maintained in the storage memory 114, and the host communicates with the storage device 104 in order to read or write the data and maintain data coherency. The device may directly access the data in the storage memory 114 (e.g., without communicating with the host device 102). However, the embodiments are not limited thereto, and the coherency bias 206 that is employed by the storage system 100 may be a host coherency bias. According to the host coherency bias, the real state of the data is maintained in the host memory 110, and the storage device 104 communicates with the host device 100 in order to read or write the data and maintain data coherency. In some embodiments, a combination of device coherency and host coherency are used (e.g., based on the type of data that is being shared).

In some embodiments, the shared data structures 200 adhere to the NVMe protocol, such as, for example, a Flexible Data Placement Mode (FDP) portion of the NVMe protocol. The data structures 200 may store FDP metadata for implementing the FDP protocol. The FDP protocol may give the host processor 108 control over one or more drive activities including, for example, garbage collection and placement of data in the NVM 116. In this regard, the FDP protocol allows data to be written to an application-specific area of the NVM 116 referred to as a reclaim unit (RU). The RU may include a set amount of physical storage of the NVM 116 (e.g., one or more memory blocks). The FDP protocol may allow the host processor 108 to tag writes to specific RUs so that the storage controller 120 may align data from multiple applications. The host/device cooperation may reduce write amplification, and allow the host to orchestrate GC.

In some embodiments RUs are organized into one or more reclaim groups (RGs) with one or more reclaim unit handles (RUHs). An RUH may reference an RU within an RG. A write command from the host processor may identify a specific RUH for controlling placement of data into the corresponding RU. Hereinafter, the term block or memory block will be used for referring to both RUs and NVM memory blocks.

Embodiments of the present disclosure are not limited to the FDP protocol, and may extend to other protocols such as, for example, a zoned namespace (ZNS) protocol and/or other similar protocols that may allow the host to cooperate with drive in activities like data placement and garage collection. The ZNS protocol may be similar to FDP, but instead of the areas of NVM 116 being referenced by RUs, the NVM 116 is divided into different namespace areas or zones. The structures associated with the zones may be exposed in a way similar to the way structures associated with RUs are exposed. Commands from the host may be directed to the zones similar to the way commands are directed to RUs.

In some embodiments, the host processor 108 is configured to access data in the shared data structures 200 of the storage device 104 in a coherent manner, in order to give the host processor 108 faster data access to drive statistics to allow the host processor to make more timely decisions about drive activities including, without limitation, GC, wear leveling, and/or data placement, than may be possible with just the FDP protocol. In this regard, the storage controller 112 (e.g., the FTL 120) may be configured to monitor and store different types of information (e.g., log data) for managing the storage device 104 (e.g., the NVM 116). The monitored information may include, for example, FDP metadata. The FDP metadata may be stored in the shared data structures 200 according to a data structure architecture specified by the FDP protocol. The FDP metadata may include, without limitation, a number of valid memory blocks that contain valid data, a number of invalid memory blocks that contain invalid data, identification available RUs (e.g., in a free pool) that may be used by the storage device 104, identification of filled (e.g., occupied) memory blocks (e.g., are not part of the free pool), and/or the like.

The monitored information may also include, for example, other data and statistics of the storage device 104. For example, the other device data may include, without limitation, temperature of the storage device, endurance estimate associated with the storage device (based on determining the number of write operations to the memory blocks), individual errors associated with underlying RUs (e.g., storage blocks mapped to the RUs), and/or other utilization statistics of the storage device. The other device data may also be stored in the shared data structures 200.

In some embodiments, the host processor 108 is configured to invoke a hint engine 208 for making a recommendation to the storage device 104 on a management activity, including garbage collection, wear leveling, data placement, and/or another management operation of the storage device. The hint engine 208 may be implemented via hardware, firmware, software, or a combination of hardware, firmware, and/or software. For example, the host processor 108 may be configured to execute instructions stored in the host memory 110 for providing the functionalities of the hint engine 208.

In some embodiments, the hint engine 208 is configured to periodically (e.g., on a regular or irregular basis) monitor the log data stored in the shared structures 200 and provide a hint or recommendation for a drive activity to be performed by the storage controller 112. A rule may be applied by the hint engine 208 to determine whether a recommendation is needed. The rule may indicate a condition that triggers the recommendation. For example, a condition that triggers a GC recommendation may be that a number of available memory blocks (e.g., RUs) of the NVM 116 are below a first threshold.

The hint engine 208 may invoke one or more other rules to select memory blocks to be recommended for the drive activity. For example, for a GC activity, the hint engine 208 may access the log data in the host cache 204 to identify one or more memory blocks that are filled with data. In some embodiments, the log data may be cached into the host cache 204 using PCIe/CXL. The log data may further indicate the number of valid and/or invalid memory blocks among the filled memory blocks. The one or more rules may identify a threshold number of invalid memory blocks that is to be contained in n RU (and/or other statistics such as low-level read errors of the underlying storage blocks of the RU) before the RU is selected as a GC candidate.

In some embodiments, the one or more rules consider other factors in selecting an RU as a GC candidate. The factors may relate to commands being processed by the host processor 108, errors logged for storage blocks underlying the RU, and/or other factors known by the host processor 108 apart from the log data. For example, the hint engine 208 may detect that a group of memory blocks (e.g., a source RG containing one or more RUs) is or may be undergoing a migration process (e.g., to a destination RG). The hint engine 208 may avoid selecting the RUs within the source RG, or even expressly indicate to the storage device 104 to avoid selecting the RUs the source RG for GC process, since the migration will cause copying of the valid RUs and deletion of the invalid RUs during the migration.

In some embodiments, the one or more rules may be for making recommendations for wear leveling. In this regard, the one or more rules may indicate that, based on statistics of the drive (e.g., temperature, program/erase count, error trend, etc.) and knowledge about the data type of data to be written (e.g., scratch data or other temporary data), a particular memory block (e.g., RU) may be recommended for storing the data. For example, a memory block that is approaching an end of its life cycle (e.g., due to a program/erase count of the block approaching a maximum allowed value) may be recommended for storing scratch or temporary data, as loss of such data may be less catastrophic than other types of data. In another example, host may identify a memory block with an error trend (e.g., increasing errors in accessing the memory block over time), and close the block (e.g., not use the block for storing future data), or select the block for storing cold data (e.g., data with access frequency lower than a threshold.

FIGS. 3-6 depict examples of the shared data structures 200 that the host device 102 and the storage device 104 may use to cooperate in the management of the storage device according to one or more embodiments. Although the example data that is stored in the shared data structures of FIGS. 3-6 include FDP metadata, embodiments of the disclosure are not limited thereto, and may extend to other types of metadata (e.g., ZNS metadata) and/or other types of information for managing the storage device 104. In some embodiments, the data that is stored in the shared data structures 200 identify the blocks of memory (e.g., RUs) recommended by the hint engine 208 for a drive activity. The shared data may also identify the storage controller's response to a recommendation made by the hint engine 208.

Figure 3:
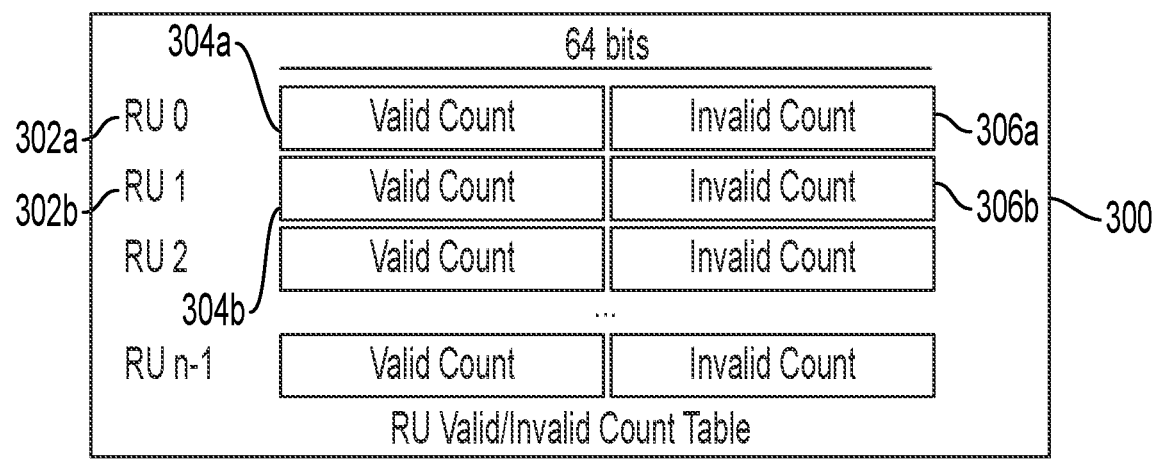
FIG. 3 depicts a shared data structure in the form of a valid/invalid table according to one or more embodiments.

FIG. 3 depicts a shared data structure in the form of a valid/invalid table 300 according to one or more embodiments. The valid/invalid table 300 may identify, for a first RU 302a, a first valid count 304a, and a first invalid count 306a. The valid/invalid table may also identify, for a RU 302b, a second valid count 304b, and a second invalid count 306b. The valid count 304a, 304b (collectively referenced as 304) may indicate a number memory blocks in the corresponding RU 302a, 302b, that contain valid data. The invalid count 306a, 306b (collectively referenced as 306) may indicate a number of memory blocks in the corresponding RU 302a, 302b, that contain invalid data. In some embodiments, the valid count 304 and invalid count 306 are written or set by the storage device 104 in the shared portion 202 of the storage memory 114, and shared with the host device 102.

Figure 4:
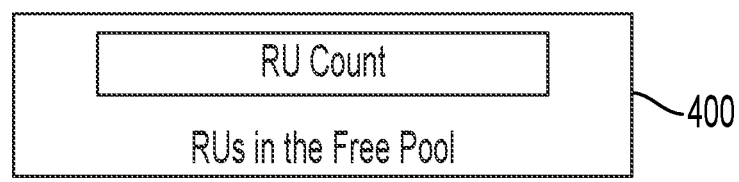
FIG. 4 depicts a shared data structure in the form of a free table according to one or more embodiments.

FIG. 4 depicts a shared data structure in the form of a free table 400 according to one or more embodiments. The free table 400 may include a number of free RUs 402 in a free pool that may be used by the storage device 104. The number of free RUs 402 may be written by the storage device 104 in the shared portion 202 of the storage memory 114, and shared with the host device 102.

Figure 5:
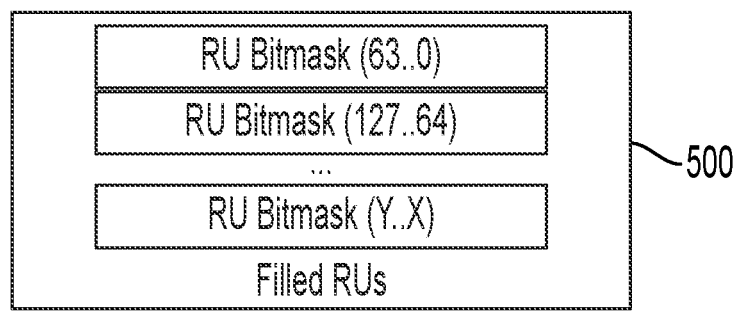
FIG. 5 depicts a shared data structure in the form of a filled table according to one or more embodiments.

FIG. 5 depicts a shared data structure in the form of a filled table 500 according to one or more embodiments. The filled table 500 may include a bitmap for the RUs, where an index bit corresponding to a RU indicates whether the RU has been written or filled and, therefore, is not part of the free pool. In some embodiments, the index bits are written or set by the storage device 104 upon determining that an RU has been filled. In some embodiments, the bitmap 500 is stored in the shared portion 202 of the storage memory 114, and shared with the host device 102.

Figure 6:
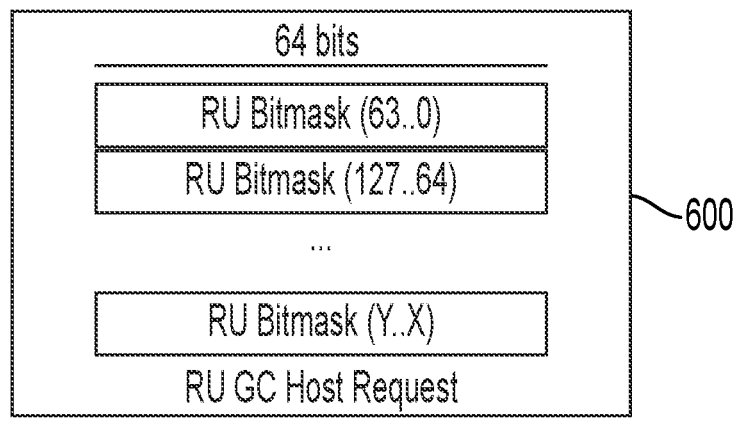
FIG. 6 depicts a shared data structure in the form of a host request table according to one or more embodiments.

FIG. 6 depicts a shared data structure in the form of a GC host request table 600 according to one or more embodiments. The GC host request table 600 may store a bitmap of index bits corresponding to the RUs that have been selected by the host device 102 as a GC candidate. In this regard, the hint engine 208 selects an RU as a GC candidate based on the log data in the shared structures 200, and the rules implemented by the host device 102. The hint engine 208 writes or sets the index bit in the GC host request table 600 that corresponds to the selected memory block. In some embodiments, other request tables are stored for other types of management actions. For example, a wear leveling request table may be maintained and updated for wear leveling actions.

In some embodiments, the storage controller 112 also writes or sets the index bit of the GC host request table 600 that corresponds to the RU recommended by the hint engine 208 for garbage collection, for indicating whether the recommendation has been honored or not. In this regard, when the storage controller 112 performs GC, it may read the GC host request table 600 for adding into the device's GC candidate list, the RUs recommended by the hint engine 208. In some embodiments, the storage controller 112 prioritizes the RUs that have been selected by the hint engine 208, over the RUs that have been selected by the storage controller 112 for garbage collection.

In some embodiments, one or more other tables similar to the GC host request table 600 are maintained in the shared memory 202 for allowing the host device 102 to make recommendations of memory blocks for other types of storage management functions. For example, a similar table may be maintained for providing recommendations of memory blocks to be used for data placement, wear leveling, and/or the like.

Figure 7:
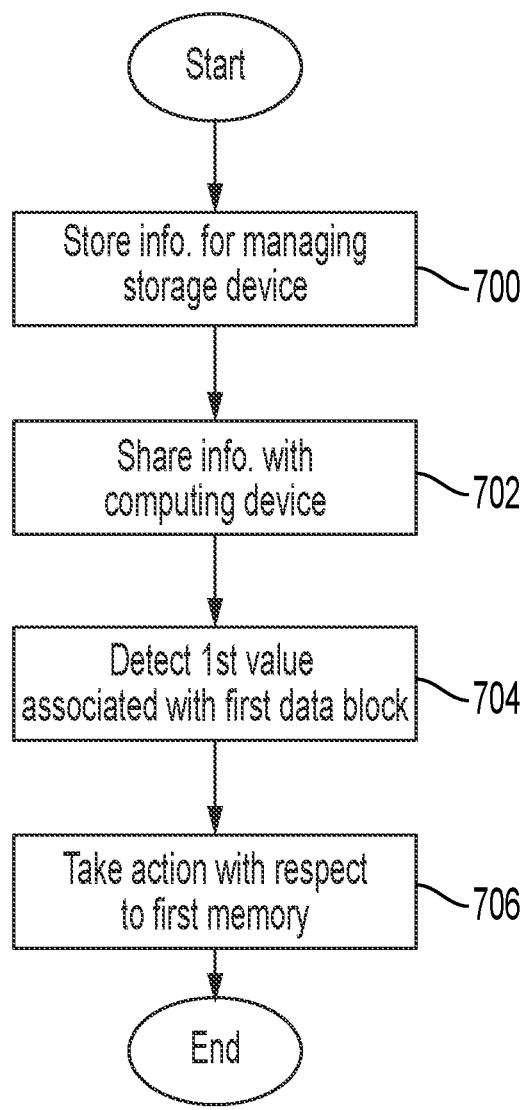
FIG. 7 depicts a flow diagram of a process for host and device collaboration for managing a storage device according to one or more embodiments.

FIG. 7 depicts a flow diagram of a process for host and device collaboration for managing a storage device according to one or more embodiments. The process starts, and in act 700, the storage device 104 (e.g., the storage controller 112) stores in the shared portion 202 of the storage memory 114 (e.g., a second memory), information for managing the storage device. The information may include, at least one of a number of valid memory blocks of the NVM 116 (e.g., a first memory), a number of invalid memory blocks (e.g., RUs), a number of free memory blocks, and/or identification of filled memory blocks. The information may also include other log data such as, for example, temperature of the storage device 104, an endurance estimate associated with the storage device, error trend of blocks (e.g., RUs), and/or utilization of the storage device.

In act 702, the information for managing the storage device 104 is shared with the host device 102 (e.g., a computing device), via a cache coherent protocol. For example, the host device 102 may transmit a memory read primitive for loading the information in the host cache 204. The host device 102 (e.g., the hint engine 208) may set a first value for a first block (e.g., RU) of the NVM 116 based on the information shared via the cache coherent protocol. For example, the hint engine 208 may select the first block as a candidate block for taking the management action (e.g., GC, wear leveling, data placement, etc.), and set an index bit (e.g., the first value) in the GC host request table 600 that corresponds to the selected block.

In act 704, the storage controller 112 detects the first value set by the hint engine 208. For example, the storage controller 112 may read the GC host request table 600 when it is time to perform the GC management action, and detect the first value in the table. For example, the host may identify a particular state of the storage device (e.g., available memory blocks lower than a threshold), and transmit a signal to the storage controller 112 for indicating that it is time to perform the management action. In other examples, the determining of the memory blocks being lower than the threshold may be performed by the storage controller 112.

In act 706, the storage controller 112 performs management of the storage device 104 based on the first value. For example, the storage controller may honor the recommendation from the hint engine 108 and perform the management action for the selected first block. For example, GC, wear leveling, or a data placement action may be performed on the first block. In some embodiments, a weight value may be configured for determining whether the recommendation from the hint engine 108 will be honored. For example, a weight value of 1.0 may indicate that the host recommendation is to be ignored, and a weight value of 0.0 may indicate that the host recommendation is to be honored always.

Figure 8:
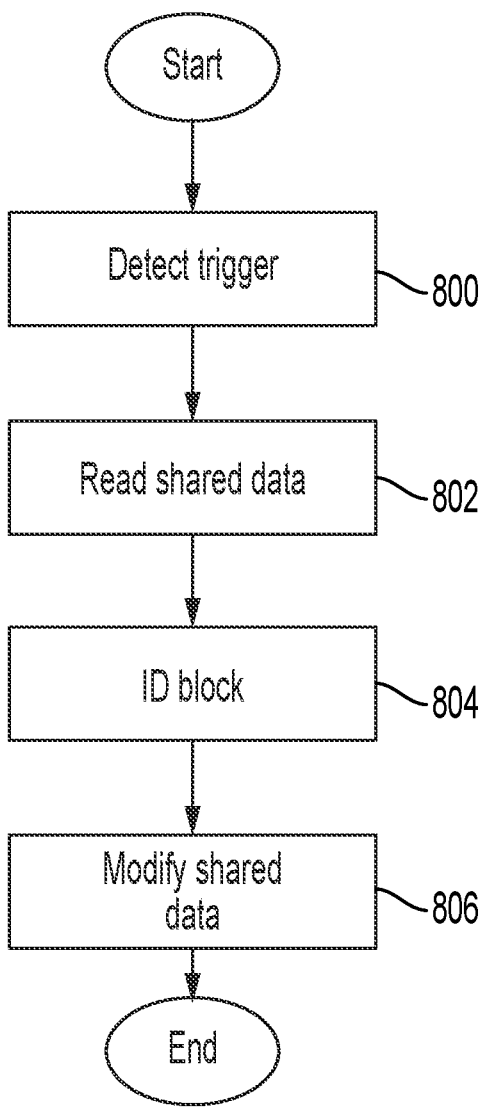
FIG. 8 depicts a flow diagram of a process for providing a recommendation by a hint engine according to one or more embodiments.

FIG. 8 depicts a flow diagram of a process for providing a recommendation (e.g., a GC recommendation) by the hint engine 208 according to one or more embodiments. The process starts, and in act 800, the hint engine 208 detects a trigger event, and in act 802, reads the shared data in the shared data structures 200. The trigger event may be, for example, passage of a certain amount of time, a command from an application or the storage device 102, a particular state of the application or the storage device, and/or the like, that may prompt the hint engine 208 to review the shared data structures 200 to determine whether a recommendation should be made. For example, the hint engine 208 may periodically read the free table 400 (e.g., cached in the host cache 204), and if the number of available memory blocks in the NVM 116 are below a threshold number, the hint engine 208 may determine that a GC recommendation may be needed.

In act 804, the hint engine 208 identifies one or more memory blocks (e.g., RUs) for recommending to the storage device in performing the GC activity. The hint engine 208 may employ one or more rules in making the recommendation. For example, the rule may be to select a memory block whose invalid count falls above a threshold (e.g., upon examining the valid/invalid table 300), or blocks that exceed a threshold for an error-trend (indicating that the block may be going bad), as a recommended GC candidate. In this regard, a bit error rate for block reads may change over time. As the error rate for a block increases (and shows a positive trend), the block may indicate wear due to the block being near its end-of-life, or may be a sub-optimal block. Such block may be selected for performing the GC activity.

In act 806 the hint engine 208 modifies the shared data in the shared data structures 200 to indicate the selection of the one or more memory blocks. For example, the hint engine 208 may write the index bits in the GC host request table 600 that correspond to the selected memory blocks. Whether the host writes into the shared portion 202 of the storage memory 114, or whether the host writes to the host cache 204 may depend on the cache bias (e.g., host or device) which determines where the "real" copy of the data is stored, forcing the peer to read the other cache to ensure that the latest data is found. For example, the index bit may be written by the hint engine 208 to the shared portion 202 of the storage memory 114, and the host cache 204 may be updated via the cache coherent protocol. In other examples, the index bit may be written by the hint engine 208 to the host cache 204, and the shared portion 202 of the storage memory 114 (e.g., a device cache) may be updated via the cache coherent protocol.

Figure 9:
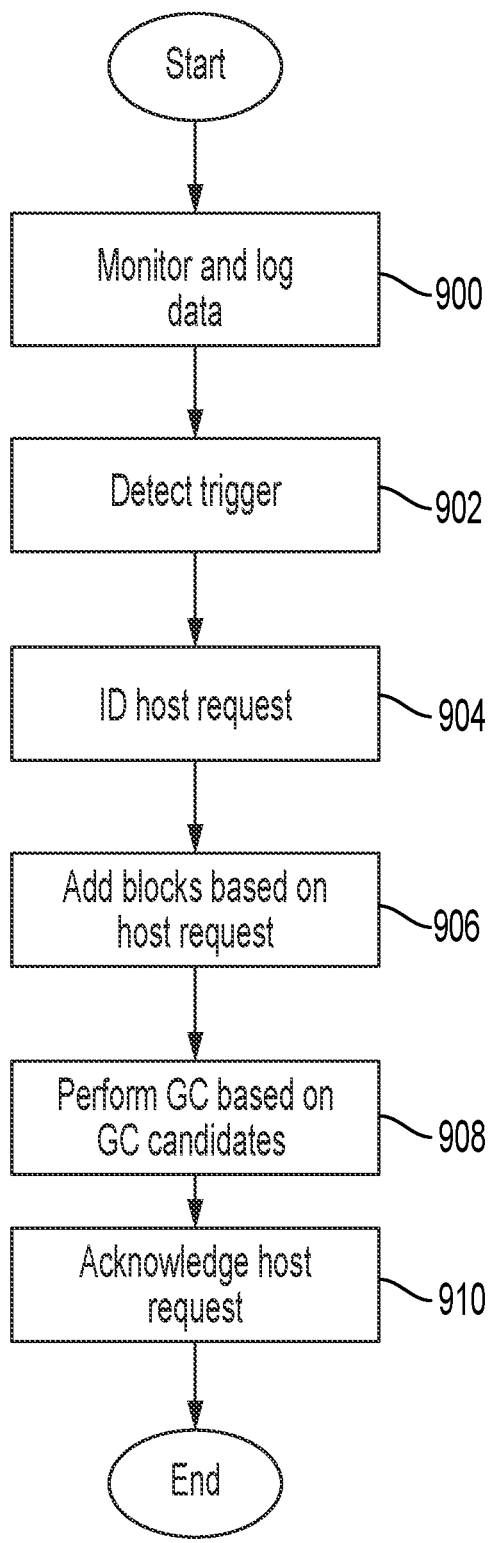
FIG. 9 depicts flow diagram of a process for performing a garbage collection operation by a storage controller according to one or more embodiments.

FIG. 9 depicts a flow diagram of a process for performing a GC operation by the storage controller 112 according to one or more embodiments. The process starts, and in act 900, the storage controller 112 monitors and logs different types of log data. For example, the storage controller 112 may monitor usage of the memory blocks of the NVM 116 and update the filled table 500 and the free table 400 accordingly. In some embodiments, the storage controller 112 further identifies the data units of a memory block that contain invalid data, and updates a valid/invalid count for the memory blocks.

In act 902, the storage controller 112 detects a trigger event for the GC operation. The trigger event may be, for example, start of an off-peak time (e.g., idle time). The off-peak time may be detected for example, by the storage controller 112, based on current processing load of the storage device. For example, the off-peak time may start when the processing load of the storage device is detected to be below a threshold amount for a certain amount of time. In other embodiments, the trigger is a counter in the shared structures 200. The counter may be incremented by the host 102 each time a data update is made. The storage controller 112 may also maintain its own internal counter, and if different, the storage controller may review the shared counter to update its internal counter.

In act 904, the storage controller 112 reads the GC host request table 600 for identifying memory blocks recommended by the hint engine 208 for garbage collection.

In act 906, the storage controller 112 adds the recommended memory blocks as GC candidates. The recommended memory blocks may be added to a list of memory blocks selected by the storage device 104 for GC. The recommended memory blocks may be the same or different from the memory blocks selected by the storage device 104.

In act 908, the GC operation is performed based on the memory blocks identified as the GC candidates. In some embodiments, the memory blocks recommended by the hint engine 208 are given a higher priority than the locally selected memory blocks. For example, garbage collection may be performed on the memory blocks recommended by the hint engine before performing garbage collection on the locally identified memory blocks, or it may consult internal rules for candidate selection.

In act 910, the storage controller 112 acknowledges the recommendations by the hint engine 208. For example, the storage controller 112 may reset the index bits of the GC host request table 600 that correspond to the recommended memory blocks for indicating that the recommendation was honored. In some embodiments, the bits are not reset for a recommended data block if the recommendation is not honored. In some embodiments, if the recommendation is not honored, the storage device handles GC as it would normally (e.g., as if the host had never made a GC recommendation), based on the storage device's decision of the memory blocks that should be subject to GC.

One or more embodiments of the present disclosure may be implemented in one or more processors (also referred to as a processing unit). The term processor may refer to one or more processors and/or one or more processing cores. The one or more processors may be hosted in a single device or distributed over multiple devices (e.g. over a cloud system). A processor may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processor, as used herein, each function is performed either by hardware configured, i.e., hard-wired, to perform that function, or by more general-purpose hardware, such as a CPU, configured to execute instructions stored in a non-transitory storage medium (e.g. memory). A processor may be fabricated on a single printed circuit board (PCB) or distributed over several interconnected PCBs. A processor may contain other processing circuits; for example, a processing circuit may include two processing circuits, an FPGA and a CPU, interconnected on a PCB.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed herein could be termed a second element, component, region, layer or section, without departing from the spirit and scope of the inventive concept.

The terminology used herein is for the purpose of describing particular embodiments only and is not intended to be limiting of the inventive concept. Also, unless explicitly stated, the embodiments described herein are not mutually exclusive. Aspects of the embodiments described herein may be combined in some implementations.

As used herein, the terms "substantially," "about," and similar terms are used as terms of approximation and not as terms of degree, and are intended to account for the inherent deviations in measured or calculated values that would be recognized by those of ordinary skill in the art.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present disclosure". Also, the term "exemplary" is intended to refer to an example or illustration. As used herein, the terms "use," "using," and "used" may be considered synonymous with the terms "utilize," "utilizing," and "utilized," respectively.

Although exemplary embodiments of systems and methods for allowing cooperation between a host device and a storage device have been specifically described and illustrated herein, many modifications and variations will be apparent to those skilled in the art. Accordingly, it is to be understood that systems and methods for allowing cooperation between a host device and a storage device constructed according to principles of this disclosure may be embodied other than as specifically described herein. The disclosure is also defined in the following claims, and equivalents thereof.

The systems and methods for processing storage transactions may contain one or more combination of features set forth in the below statements.

Statement 1. A storage device comprising: a first memory for storing data; a second memory configured with a cache coherent protocol; and a processing circuit coupled to the first memory and the second memory, the processing circuit being configured to: store, in the second memory, information for managing the storage device, wherein the information is shared with a computing device via the cache coherent protocol; receive a first value from the computing device, the first value associated with a first block of the first memory; and take an action with respect to the first block based on the first value, wherein the action is for managing the first memory.

Statement 2. The storage device of Statement 1, wherein the second memory includes a first cache memory and the computing device includes a second cache memory, wherein the information and the first value are stored in the first cache memory and the second cache memory.

Statement 3. The storage device of Statement 1, wherein the information for managing the storage device includes at least one of: a number of valid blocks of the first memory; a number of invalid blocks of the first memory; a number of free blocks; or identification of a filled block.

Statement 4. The storage device of Statement 1, wherein the information for managing the storage device includes at least one of a temperature of the storage device, endurance estimate associated with the storage device, or utilization of the storage device.

Statement 5. The storage device of Statement 1, wherein the first value includes an indication that the first block has been selected by the computing device.

Statement 6. The storage device of Statement 1, wherein the action includes a garbage collection action.

Statement 7. The storage device of Statement 1, wherein the action includes a wear leveling action.

Statement 8. The storage device of Statement 1, wherein the computing device is configured to set the first value based on a rule.

Statement 9. The storage device of Statement 8, wherein the rule includes identification of a threshold number of available blocks of the first memory.

Statement 10. The storage device of Statement 1, wherein the processing circuit is configured to: detect a trigger for taking the action; identify a second block of the first memory based on the trigger; add the first block and the second block as candidates for taking the action.

Statement 11. The storage device of Statement 1, wherein the processing circuit is configured to: signal the computing device relating to the first block based on taking the action.

Statement 12. The storage device of Statement 11, wherein the signal is indicative of the processing circuit having performed the action.

Statement 13. The storage device of Statement 1, wherein the computing device is configured to set the first value based on the information shared via the cache coherent protocol.

Statement 14. A method comprising: storing data in a first memory of a storage device; storing, in a second memory of the storage device, information for managing the storage device, wherein the information is shared with a computing device via a cache coherent protocol; receiving a first value from a computing device, the first value associated with a first block of the first memory; and taking an action with respect to the first block based on the first value, wherein the action is for managing the first memory.

Statement 15. The method of Statement 14, wherein the second memory includes a first cache memory and the computing device includes a second cache memory, wherein the information and the first value are stored in the first cache memory and the second cache memory.

Statement 16. The method of Statement 14, wherein the information for managing the storage device includes at least one of: a number of valid blocks of the first memory; a number of invalid blocks of the first memory; a number of free blocks; or identification of a filled block.

Statement 17. The method of Statement 14, wherein the information for managing the storage device includes at least one of a temperature of the storage device, endurance estimate associated with the storage device, or utilization of the storage device.

Statement 18. The method of Statement 14, wherein the first value includes an indication that the first block has been selected by the computing device.

Statement 19. The method of Statement 14, wherein the action includes a garbage collection action.

Statement 20. The method of Statement 14, wherein the action includes a wear leveling action.

What is claimed is:

1. A storage device comprising:
   a first memory for storing data in a plurality of blocks;
   a second memory configured with a cache coherent protocol; and
   a processing circuit coupled to the first memory and the second memory, the processing circuit being configured to:
   store, in the second memory, information for managing the storage device, wherein the second memory is attached to a computing device over a data communications link, wherein the computing device includes a processor and a third memory configured with a cache coherent protocol;
   communicate with the computing device over the data communications link according to the cache coherent protocol for storing a copy of said information stored in the second memory, into the third memory of the computing device;
   receive a first value from the computing device, wherein the first value is generated by the computing device based on the copy of the information in the third memory, the first value being associated with a first block of the plurality of blocks of the first memory; and
   take an action with respect to the first block based on the first value, wherein the action is for managing the first memory,
   wherein the storage device is external to the processor of the computing device.

2. The storage device of claim 1, wherein the second memory includes a first cache memory and the computing device includes a second cache memory, wherein the information and the first value are stored in the first cache memory and the second cache memory.

3. The storage device of claim 1, wherein the information for managing the storage device includes at least one of:
   a number of valid blocks of the first memory;
   a number of invalid blocks of the first memory;
   a number of free blocks; or
   identification of a filled block.

4. The storage device of claim 1, wherein the information for managing the storage device includes at least one of a temperature of the storage device, endurance estimate associated with the storage device, or utilization of the storage device.

5. The storage device of claim 1, wherein the first value includes an indication that the first block has been selected by the computing device.

6. The storage device of claim 1, wherein the action includes a garbage collection action.

7. The storage device of claim 1, wherein the action includes a wear leveling action.

8. The storage device of claim 1, wherein the computing device is configured to set the first value based on a rule.

9. The storage device of claim 8, wherein the rule includes identification of a threshold number of available blocks of the first memory.

10. The storage device of claim 1, wherein the processing circuit is configured to:
    detect a trigger for taking the action;
    identify a second block of the first memory based on the trigger;
    add the first block and the second block as candidates for taking the action.

11. The storage device of claim 1, wherein the processing circuit is configured to:
    signal the computing device relating to the first block based on taking the action.

12. The storage device of claim 11, wherein the signal is indicative of the processing circuit having performed the action.

13. The storage device of claim 1, wherein the computing device is configured to set the first value based on the information shared via the cache coherent protocol.

14. A method comprising:
    storing data in a plurality of blocks in a first memory of a storage device;
    storing, in a second memory of the storage device, information for managing the storage device, wherein the second memory is attached to a computing device over a data communications link, wherein the computing device includes a processor and a third memory configured with a cache coherent protocol;
    communicating with the computing device over the data communications link according to the cache coherent protocol for storing a copy of said information stored in the second memory, into the third memory of the computing device;

receiving a first value from the computing device, wherein the first value is generated by the computing device based on the copy of the information in the third memory, the first value being associated with a first block of the plurality of blocks of the first memory; and taking an action with respect to the first block based on the first value, wherein the action is for managing the first memory, wherein the storage device is external to the processor of the computing device.

15. The method of claim 14, wherein the second memory includes a first cache memory and the computing device includes a second cache memory, wherein the information and the first value are stored in the first cache memory and the second cache memory.

16. The method of claim 14, wherein the information for managing the storage device includes at least one of:

a number of valid blocks of the first memory;

a number of invalid blocks of the first memory;

a number of free blocks; or identification of a filled block.

17. The method of claim 14, wherein the information for managing the storage device includes at least one of a temperature of the storage device, endurance estimate associated with the storage device, or utilization of the storage device.

18. The method of claim 14, wherein the first value includes an indication that the first block has been selected by the computing device.

19. The method of claim 14, wherein the action includes a garbage collection action.

20. The method of claim 14, wherein the action includes a wear leveling action.

* * * * *